US005211896A

United States Patent [19]

Ward et al.

[11] Patent Number: 5,211,896

[45] Date of Patent: May 18, 1993

[54] COMPOSITE IRON MATERIAL

[75] Inventors: Robert W. Ward, Anderson; David E. Gay, Noblesville, both of Ind.

[73] Assignee: General Motors Corporation, Detroit, Mich.

[21] Appl. No.: 710,427

[22] Filed: Jun. 7, 1991

[51] Int. Cl.[5] .......................... H01F 1/06; B29C 43/02

[52] U.S. Cl. .................................. 264/126; 252/62.54; 264/DIG. 58; 427/214; 427/216; 428/407

[58] Field of Search ...................... 264/126, 319, 328.1, 264/328.17, DIG. 58; 427/214, 216; 428/407; 148/105; 252/62.54

[56] References Cited

U.S. PATENT DOCUMENTS

| | | | |
|---|---|---|---|
| 1,783,561 | 12/1930 | Eisenmann . | |
| 1,789,477 | 1/1931 | Roseby . | |
| 1,982,689 | 12/1934 | Polydoroff | 175/21 |
| 2,162,273 | 6/1939 | Schulze | 175/21 |
| 2,648,609 | 8/1953 | Wurster | 99/166 |
| 3,117,027 | 1/1964 | Lindlof et al. | 118/303 |
| 3,253,944 | 5/1966 | Wurster | 117/100 |
| 3,354,863 | 11/1967 | Reynolds | 118/62 |
| 3,451,934 | 6/1969 | Hubbard | 252/62.54 |
| 3,935,340 | 1/1976 | Yamaguchi et al. | 427/216 |
| 3,992,558 | 11/1976 | Smith-Johannsen et al. | 427/213 |
| 4,601,765 | 7/1986 | Soileau et al. | 148/104 |
| 4,696,725 | 9/1987 | Ochiai et al. | 252/62.54 |
| 4,947,065 | 8/1990 | Ward et al. | 310/44 |
| 5,063,011 | 11/1991 | Rutz et al. | 264/126 |

*Primary Examiner*—Mary Lynn Theisen
*Attorney, Agent, or Firm*—Lawrence B. Plant

[57] ABSTRACT

A mass of ferromagnetic particles moldable into stable, high strength, magnetic cores useful in thermally and chemically hostile environments comprising an iron core and a continuous layer of polyetherimide, polyethersulfone or polyamideimide spray coated onto the surface of each particle. A method of preheating and molding the particles is disclosed.

15 Claims, 1 Drawing Sheet

COMPOSITE IRON MATERIAL

Figure 1:
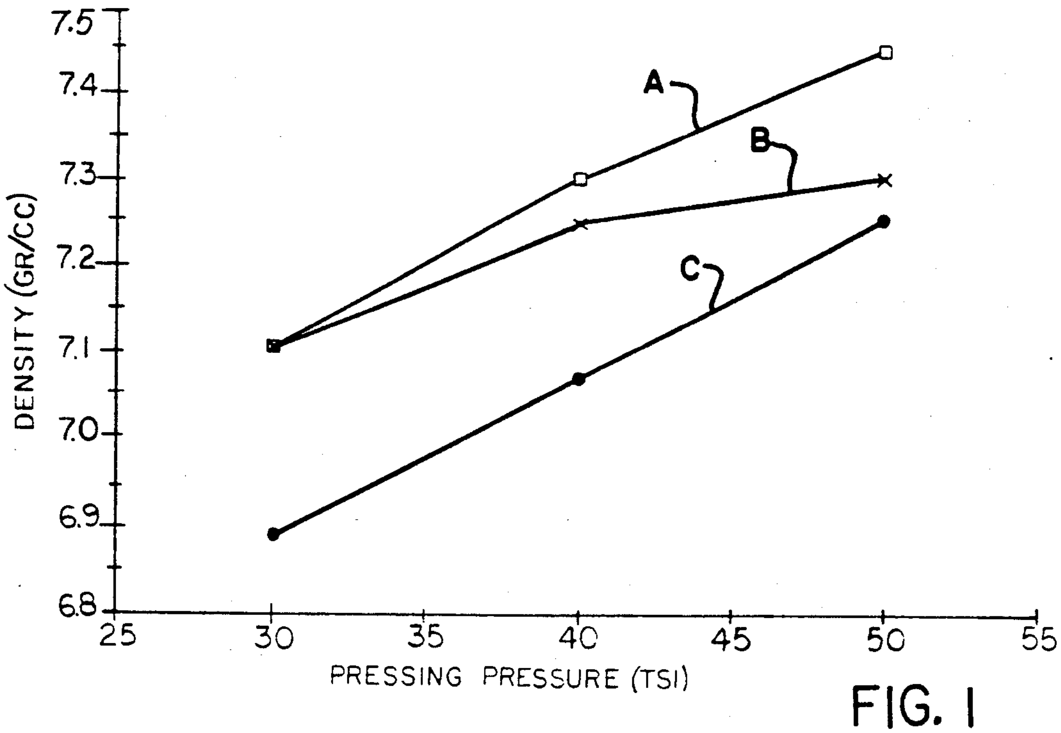

This invention relates to polymer-coated iron particles and a method of molding them to form soft magnetic cores for electrical devices.

BACKGROUND OF THE INVENTION

It is known to make soft magnetic cores for electromagnetic devices such as transformers, inductors, motors, generators, relays, and the like, by pressing powdered iron into the desired core shape. The term "iron" as used herein applies not only to substantially pure iron but to the well known alloys thereof used for such purposes including, for example, Fe-Si, Fe-Al, Fe-Si-Al, Fe-Ni, Fe-Co, etc. Alloyed iron provides higher magnetic permeability and lower total core losses (i.e., eddy current, hysteresis and anomalous losses) and results in devices having higher efficiencies than devices using pure iron cores. It is likewise known that to insure that cores formed from such powders have low total core losses, the individual particles must be electrically insulated one from the other. On the other hand, to provide the maximum magnetic permeability the amount of interparticle insulation should be minimized and iron content maximized. Hence, cores made from polymer-bonded iron particles should have as low a polymer content as is possible which unfortunately tends to reduce the physical strength of the core. One known technique for electrically insulating the several particles from each other is to coat the surface of the particles with inorganic insulating materials such as iron phosphate or alkali metal silicate inorganic coatings, and/or organic polymeric materials such as: amber (Schulze U.S. Pat. No. 2,162,273); phenol-aldehyde condensation products (Roseby U.S. Pat. No. 1,789,477 or Hubbard U.S. Pat. No. 3,451,934); varnishes formed from Chinawood oil and/or phenol resin (Polydoroff U.S. Pat. No. 1,982,689); resinous condensation products of urea or thiourea or derivatives thereof with formaldehyde (Eisenman U.S. Pat. No. 1,783,561); polymerized ethylene, styrene, butadiene, vinyl acetate, acrylic acid esters and derivatives thereof, copolymers of two or more of the foregoing as well as fluorine type polymers (Ochiai U.S. Pat. No. 4,696,725); radical polymerizable monomers such as styrene, vinyl acetate, vinyl chloride, acrylonitrile, acrylic acid esters, methacrylic acid esters, acrylic acid salts, methacrylic acid salts, divinyl benzene, N-methylol acrylamide and the like (Yamaguche U.S. Pat. No. 3,935,340); and silicones, polyimides, fluorocarbons and acrylics (Soileau et al U.S. Pat. No. 4,601,765). In some instances, the iron particles have an inorganic undercoating and an organic topcoat (e.g., Soileau et al supra, Katz U.S. Pat. No. 2,783,208 and VerWeij U.S. Pat. No. 3,232,352).

It has heretofore been proposed to polymer coat magnetic core-forming iron particles in a number of ways including: (1) dispersing the particles in a solution of the polymer dissolved in a solvent and driving off the solvent; (2) polymerizing the polymer in situ on the surface of the particles; and (3) coating the particles in a fluidized bed thereof with the polymer dissolved in an appropriate solvent.

While the aforesaid polymer-coated particles are capable of forming cores for some applications, none are seen to be satisfactory for readily compression or injection molding magnetic cores which have high permeability, low total core losses, high physical strength and are capable of surviving in chemically and thermally hostile environments such as are found in the engine compartment of an automobile where the core is often subjected to temperatures above about 200° C., and a variety of corrodents including high humidity, salt, and fuel/lubricant vapors. Unfortunately, the more common polymers that one might expect would survive, and accordingly be useful in, such a hostile environment do not have the processability characteristics needed to completely coat the particles and/or to readily mold high density, high strength cores therefrom having the desired physical and magnetic properties.

Indeed most polymers otherwise suitable for such a hostile environment are thermosets which after having been once cured about the iron particle cannot be dissolved, reprocessed or compression/injection molded. On the other hand, most thermoplastics which might be both moldable and capable of withstanding the hostile environment cannot practically be coated uniformly and continuously onto small iron particles primarily because they are either essentially insoluble in industrially acceptable solvents (for example, crystalline thermoplastics), do not coat the particles well, cannot be readily handled in a heated condition preparatory to molding (e.g., becomes tacky), and/or have too high a melt viscosity for proper filling out of the shaping die during molding. On the other hand and as a general rule, amorphous thermoplastics would not be expected to survive the hostile environments owing to their solvent vulnerability in fuel and lubricant vapors and poor temperature resistance.

An ideal polymer would be a thermoplastic which can survive in a chemically and thermally hostile environment, which is soluble in industrially acceptable solvents for coatability, which serves as a lubricant for optimum densification of the particles under compression molding conditions, which has a low melt viscosity for optimal in-the-die flow when molten and which has a non-sticky surface at temperatures within about 110° C. of its softening point for premolding handling and processability in a heated condition. In this latter regard, a non-sticky surface at this elevated temperature allows the particles to remain free-flowing at temperatures near the softening point which permits preheating them while still allowing automatic mechanical feeding of same into a heated die. This, in turn, results in shorter die cycle times and significantly stronger molded cores owing to a more uniform temperature throughout the particle mass in the die during molding. In this regard, the term softening point is intended to mean the temperature where the polymer becomes sufficiently fluid as to flow readily within the tooling (i.e., under pressures of about 20–50 TSI) to fill the die completely yet not be so "watery" as to separate from the particles. Cooler particles tend not to heat adequately in the center of the molded core resulting in a well fused shell surrounding a weaker fused center.

Figure 2:
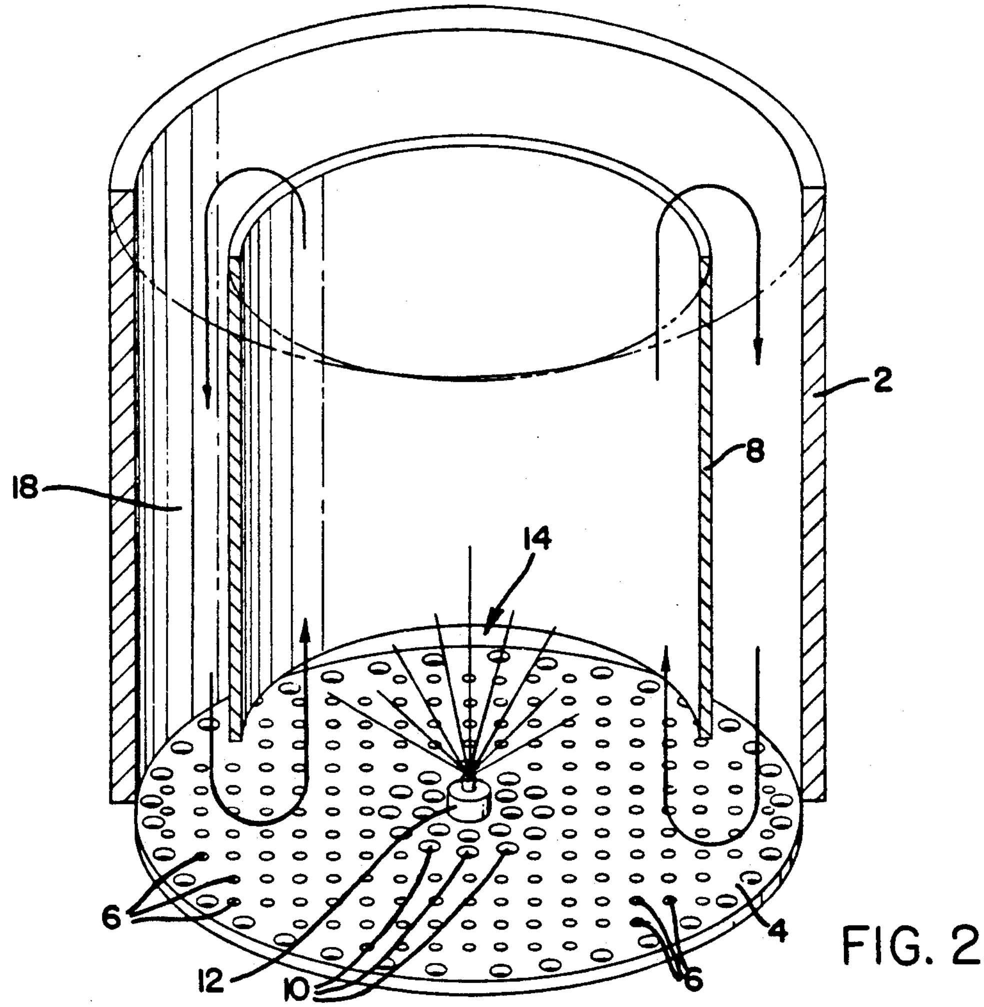

It is the object of this invention to, provide an easily prepared, mass of polymer-coated ferromagnetic particles which are capable of being readily compression or injection molded into high strength, temperature and chemical resistant magnetic cores having high magnetic permeability and low total core losses and a process for molding such cores. These and other objects and advantages of the present invention will become more readily apparent from the description thereof which is given hereafter in conjunction with the drawings in which:

FIG. 1 is a plot of densities vs. pressing pressures for different materials; and FIG. 2 is a perspective, sectioned view of the coating zone of a Wurster-type fluidized bed coater.

THE INVENTION

According to the present invention, there is provided a mass of polymer-coated ferromagnetic particles which are readily processable into physically strong magnetic cores capable of surviving thermally and chemically hostile environments such as found in the engine compartment of automobiles, trucks, and the like. The particles range in size from about 5 microns to about 400 microns and are readily injection moldable, or compression moldable at low pressures, (i e., about 20-50 tons per square inch TSI) into high strength magnetic cores which have high permeability (i.e., greater than about 500 gaussOrsteds @300 Hz) and low total core losses (i.e., less than about 100 watts/lb. at 500 Hz). Total core losses are less with higher polymer content. For higher permeability cores, the particles are preferably about 125-350 microns in size.

The particles each comprise an iron core encapsulated in a continuous shell of an amorphous thermoplastic selected from the group consisting of a polyetherimide, polyethersulfone and polyamideimide having a heat deflection greater than about 200° C. (ASTM D-648). The thermoplastics will preferably have a melt viscosity (i.e., at 360° C.) less than about 5500 poises (i.e., at a shear rate of 1000 reciprocal seconds) and most preferably less than about 2200 poises. Polyamideimide is also reactive at its melting temperature so that it flows well below its melt temperature but while in the melt state slowly reacts and begins to lose its flowability. Hence, these polymers have excellent flow characteristics and distribute well throughout the heated die cavity without separating from the iron particles. Suitable polyethersulfones have molecular weights of about 15,000, a melting temperature of about 299° C. and a softening temperature somewhat below 299° C. Suitable polyetherimides have molecular weights between about 22,000 and 35,000, a melting temperature of about 252° C. and a softening temperature somewhat below 252° C. Suitable polyamideimides will have a molecular weight of about 4000, a melting temperature of about 316° C. and a softening temperature somewhat below 316° C. Suitable polyethersulfones are materials sold commercially as VICTREX TM in grades 3600P, 4100P and 4800P by the ICI Americas Corporation. Suitable polyetherimides are available commercially from the General Electric Company under the name ULTEM in various grades including ULTEM TM 1000, 1010, 1020, 1030 and 1040. Suitable polyamideimides are available commercially from the AMOCO Corporation under the trade name "TORLON" "TORLON" (e.g., grade 4000 T).

The thermoplastic shell is preferably deposited onto the surface of each particle from a spray of the thermoplastic dissolved in an industrially acceptable solvent. In this regard, the thermoplastic-solvent solution is sprayed into a fluidized bed of airborne particles circulating in a suitable coating apparatus. Suitable apparatus for conducting such fluidized bed coating are well known in the art and, for example, are disclosed in such patents as Smith-Johannson U.S. Pat. No. 3,992,558, Lindlof et al U.S. Pat. No. 3,117,027, Reynolds U.S. Pat. No. 3,354,863, Wurster U.S. Pat. No. 2,648,609, and Wurster U.S. Pat. No. 3,253,944. Preferably, the particles are coated using a Wurster-type batch coating apparatus comprising a cylindrical outer vessel having a perforated floor through which heated air or inert gas is passed upwardly to heat and fluidize a batch of particles initially charged into the vessel and lying atop the floor. The size of the perforations in the floor decreases from the center of the floor radially outwardly (i.e., the perforations in the center of the floor are larger than those nearer the periphery of the floor). Within the outer vessel is a concentric inner, open-ended cylinder suspended above the center of the perforated plate, i.e., above the larger diameter centermost perforations. A spray nozzle is centered beneath the inner cylinder for spraying the thermoplastic solution upwardly into the inner cylinder as the fluidized iron particles circulate upwardly through the inner cylinder. In this regard, because the larger perforations in the center of the floor of the vessel lie immediately beneath the inner cylinder, a higher volume of air moves upwardly through the inner cylinder than outside the inner cylinder which results in some of the particles being carried upwardly through the inner cylinder while others descend in the annular region between the inner and outer cylinders where the air flow is less. Hence, the particles continuously circulate upwardly through the center of the inner cylinder and downwardly on the outside thereof and each particle makes repeated passes through the coating zone in the inner cylinder. The warm air that suspends the particles also serves to vaporize the solvent in the spray and causes the thermoplastic to deposit onto the particles. The particles rapidly circulate in this manner and, on each pass through the inner cylinder, receive an additional thermoplastic deposit so that the thermoplastic shell is actually built up over a period of time each time the particle passes through the coating zone. It is this multi-depositing or layering of the thermoplastic that insures the formation of a continuous substantially uniformly thick coating.

Unlike many other high temperature, chemical resistant thermoplastics, these particular thermoplastics are sufficiently soluble (i.e., up to about 5%-10% by weight) in industrially acceptable, volatile solvents that they can be uniformly spray-deposited onto the particles in a fluidized bed reactor so as to form a continuous coating over the entire surface of each particle. At the same time, they are sufficiently insoluble in fuel and lubricant-type solvents and vapors as to be able to survive in the hostile environment of a vehicle engine compartment. Moreover, these thermoplastics not only produce a physically strong core but, serve as lubricants for the particles for imparting flowability to the particles for ready handling thereof in the process equipment and optimal filling of compression molding dies therewith in order to achieve maximum core densities (i.e., greater than 7.25 g/cc at 50 TSI) which translates into higher iron content in each core.

The significance of the polymer coating in achieving high core densities is shown in FIG. 1 which shows that it is possible to mold higher density cores with the thermoplastic coating than with iron alone. In this regard, curve A shows the densities achievable with 0.75% polyetherimide coating, curve B shows the densities achievable with a 0.5% polyetherimide coating and curve C iron alone (i.e., with 0.3% Zn stearate lubricant). Moreover and quite importantly, particles coated with these materials can be heated to within about 110° C. of their softening temperatures without becoming too sticky to handle in production equipment (e.g., auger-type conveyers for feeding particles to the molding dies). Preheating all of the particles (e.g., in the handling equipment and just prior to putting them into a compression molding die) to a substantially uniform temperature near (i.e., within about 110° C.) their softening temperatures not only accelerates the molding operation but results in a significantly stronger core. No other thermoplastics are known which will remain free-flowing during such preheating yet still be resistant to chemically and thermally hostile environments (i.e., in the finished product) discussed above. Of these materials, polyetherimide is preferred, because not only does it have the requisite physical properties, but it is the least expensive and easiest to dissolve in a single solvent (i.e., methylene chloride). Polyamideimide (i.e., TORLON TM ) costs about four times more than polyetherimide and, according to its manufacturer, may require a post curing operation to achieve optimal, tensile strength and chemical resistance. Polyethersulfone is somewhere in-between on cost and typically requires a mixed solvent (methylene chloride and cosolvent) for keeping the polymer in solution. N-methylpyrillidone may be used as a single solvent for polyethersulfone and polyamideimide. This solvent requires a higher coating temperature than methylene chloride.

Polymer thicknesses vary from about 0.3 $\mu$ for very small particles (i.e., about 42 microns) having $\frac{1}{2}$ percent plastic to about 4.5 microns for large particles (i.e., about 390 microns) having $\frac{3}{4}$ percent plastic. Substantially uniform thicknesses of the coating is desirable from a manufacturing standpoint because it permits the reliable use of statistical process control techniques in the core manufacturing process. Moreover, uniform thicknesses assures more uniform dispersion of the metal particles throughout the core which in turn results in more uniform magnetic properties throughout the core. Finally, the more uniform the coating on the metal particle the more consistent is the performance of the core in use.

In order to achieve substantially uniform coating thickness on all the particles, it has been found desirable to first classify the iron particles into batches of approximately the same size (e.g., small, medium and large) before they are coated with the polymer. Each batch is then coated separately to the desired thickness and, after they have been coated, the particles are then remixed into any desired particle size distribution. Where the particles are coated without preclassification and with a wide particle size range, it has been found that there is a tendency for the larger and smaller particles to be preferentially coated leaving the particles in the mid-size range with a lesser degree of coating thereon.

While magnetic cores made from the polyetherimide, polyethersulfone or polyamideimide coated iron of the present invention may comprise a considerable amount of polymer, it is preferable that the polymer content be kept to a minimum consistent with the physical strength requirements of the core so that the maximum core density can be achieved for cores requiring high magnetic permeability. With polyetherimide, the physically strongest cores comprise about 5% by weight polymer. Above about 5% no appreciable increase in strength is observed. Likewise with polyetherimide, the best compromise between physical strength and magnetic permeability is about 0.60%–1% by weight polymer content. As a practical matter, it has been found that when very low polymer content is important (e.g., for permeability), the cores must be compression molded, since upwards of about 8%–10% by weight polymer content is needed to injection mold cores. Hence injection molding processes can only be used for applications that do not require cores having maximum magnetic permeability. For applications requiring maximum permeability, compression molding is required and it is preferable that the thermoplastic loading be less than about 1 percent by weight and most preferably about 0.25–0.5 percent by weight. At these low levels and for some applications, it may also be desirable to have a secondary insulating coating (e.g., phosphate or silicate) directly atop the iron before it is encapsulated in the polymer to insure that the particles are completely insulated from each other. By way of example as to the effectiveness of secondary insulating coatings, cores made from coated particles (i.e., Hoeganaes 1000 C Fe powder) comprising 1% polyetherimide, preheated to 177° C., and pressed at 50 tons/in$^2$ in a die heated to 280° C. showed that without an iron phosphate undercoating the total core losses (i.e. at 10,000 Gauss and 500 Hz frequency) were about 66 watts/lb whereas with an iron phosphate coating the losses were only about 41 watts/lb. However, ferromagnetic particles in accordance with the present invention have demonstrated the capability of making excellent magnetic cores having high permeability and low total core losses using only the polymer itself as the insulation between the particles.

One of the particular advantages of the thermoplastics of the present invention is their ability to lubricate the particles to such a degree that only low compression molding pressures are required to compact the particles into a highly dense core material. In this regard for example, powdered iron sold by the Hoeganaes Co. as grades 1000, 1000B and 1000C were coated with 1% by weight polyetherimide (i.e. ULTEM 1000 TM ) and compacted to a density of 7.38 g/cc with as little as 50 tons/in$^2$ (TSI) of pressing pressure. Using the same materials, densities of about 7.46 g/cc were achieved with as little as 50 tons/in$^2$ with ULTEM loadings of 0.5 percent.

In accordance with the preferred embodiment of the invention the iron particles are coated using a Wurster-type, spray-coating, fluidized bed coating apparatus discussed above and schematically illustrated in FIG. 2. Essentially the apparatus comprises an outer cylindrical vessel 2 having a floor 4 with a plurality of perforations 6 therein, and an inner cylinder 8 concentric with the outer vessel 2 and suspended over the floor 4. The perforations 10 and 20 at the center of the floor 4 and at the periphery of the plate 4 respectively are larger than those lying therebetween. A spray nozzle 12 is centered in the floor 4 beneath the inner cylinder 8 and directs a spray 14 of thermoplastic dissolved in solvent into the coating zone within the inner cylinder 8. A batch of iron powder (not shown) is placed atop the floor 4 and the vessel 2 closed. Sufficient warm air is pumped through the perforations 6 in the floor 4 to fluidize the particles and cause them to circulate within the coater in the direction shown by the arrows 16. In this regard, the larger apertures 10 in the center of the floor allow a larger volume of air to flow upwardly through the inner cylinder 8 than in the annular zone 18 between the inner and outer cylinders 8 and 2, respectively. As the particles exit the top of the inner cylinder 8 and enter the larger cylinder 2, they decelerate and move radially outwardly and fall back down through the annular zone 18. The large apertures 20 adjacent the outer vessel provide more air along the inside face of the outer wall of the outer vessel 2 which keeps the particles from statically clinging to the outer wall as well as provides a transition cushion for the particles making the bend into the center cylinder 8.

During startup, the particles are circulated, in the absence of any polymer/solvent spray, until they are heated to the desired coating temperature by the heated air passing through the floor 4. After the particles have been thusly preheated, the dissolved polymer is sprayed upwardly into the circulating bed of particles and the process continued until the desired amount of polymer has been deposited onto the particles. The amount of air needed to fluidize the iron particles varies with the batch size of the particles, the precise size and distribution of the perforations in the floor 4 and the height of the inner cylinder 8 above the floor 4. The air is adjusted so that the bed of particles becomes fluidized and circulates within the coater as described above. Filters, not shown, are located in the coater well above the inner cylinder to prevent particles from exiting the coater with the fluidizing air.

In one specific example, 15 Kg of iron particles identified as 1000C by their manufacturer (Hoeganaes Metals) are coated with about 2 percent by weight polyetherimide identified as ULTEM 1000-1000 by its manufacturer (General Electric) in a Wurster-type coater having a seven inch (7") diameter outer vessel ( i.e. at the level of the perforated floor) and a three inch (3") diameter inner cylinder which is ten inches (10") long. The outer vessel widens to about 9 inches diameter through a distance of 16 inches above the floor and then becomes cylindrical. The bottom of the inner cylinder is about one half inch (½") above the floor of the coater. The polyetherimide is dissolved in methylene chloride (i.e., about 10% by weight polyetherimide) and air sprayed through the nozzle at a solution flow rate of about 40 grams/min. The fluidizing air is pumped through the perforations at a rate of about 100-200 $m^3$/hr. and a temperature of about 55° C. which is sufficient to fluidize the particles to a height of about 44 inches above the perforated floor.

Magnetic cores of the desired shape are then compression molded from the coated particles. The coated particles are loaded into a supply hopper standing offset from and above the molding press. The particles are gravity fed into an auger-type particle feeding mechanism which substantially uniformly preheats the particles to a desired temperature (i.e., typically about 188° C. for polyetherimides) while they are in transit to the tooling (i.e., punch and die which are heated to about the melting temperature of the polymer (i.e., approximately 316° C.). The preheated particles are fed into a heated feed hopper which in turn feeds the die via a feed shoe which reciprocates back and forth between the feed hopper and the die. The amount of particles required to fill the heated tooling is determined by the thickness of the part and the apparent density of the powder. After the die is filled with particles, the heated punch enters the die and presses the particles to the desired shape in the die and coalesce the polymer into a continuous matrix for the iron particles. The pressed part is then removed from the die.

While the invention has been disclosed in terms of specific embodiments thereof it is not intended to be limited thereto but rather only to the extent set forth hereafter in the claims which follow.

The embodiments of the invention in which an exclusive property or privilege is claimed are defined as follows:

1. A mass of ferromagnetic particles in the size range of about 5 microns to about 400 microns for molding into stable, high strength, magnetic cores useful in thermally and chemically hostile environments, said particles each comprising an iron core and a single insulating material deposited directly onto and substantially continuously over, the entire surface of each said core so as to completely encapsulate said core in an electrically insulating outer shell of said material, said material being selected from the group consisting of amorphous thermoplastic polyetherimides, polyethersulfones and polyamideimides having heat distortion temperatures of at least about 200° C.

2. A mass of particles according to claim 1 wherein said thermoplastic insulating material comprises up to about 10 percent by weight of said mass.

3. A mass of particles according to claim 2 compression moldable at pressures of about 50 tons/$in^2$ into cores having densities greater than about 7.25 g/cc, magnetic permeabilities of at least about 500 gaussOrsteds at 300 Hz and total core losses no greater than 100 watts/lb. at 500 Hz, wherein said thermoplastic insulating material comprises less than about 1.0 percent by weight of said mass.

4. A mass of particles according to claim 3 wherein said thermoplastic insulating material comprise at least about 0.60 percent by weight of said mass.

5. A mass of particles according to claim 1 comprising predominantly particles in the size range 125–130 microns.

6. A mass of ferromagnetic particles according to claim 1 where said insulating material is spray-deposited onto each of said cores.

7. A mass of ferromagnetic particles in the size range of about 5 microns to about 400 microns for molding into stable, high strength, magnetic cores useful in thermally and chemically hostile environments, said particles each comprising an iron core and a continuous layer of an amorphous thermoplastic spray-deposited substantially uniformly over the entire surface of said core so as to completely encapsulate said core in said thermoplastic, said thermoplastic being selected from the group consisting of polyetherimides and polyamideimides having a heat distorting temperature of at least about 200° C.

8. A mass of particles according to claim 7 wherein said thermoplastic is polyetherimide and comprises up to about 10 percent by weight of said mass.

9. A mass of particles according to claim 8 compression moldable at pressures of about 50 tons/$in^2$ into cores having densities greater than about 7.25 g/cc, magnetic permeabilities of at least about 500 gaussOrsteds at 300 Hz and total core losses no greater than 100 watts/lb. at 500 Hz, wherein said thermoplastic comprises less than about 1.0 percent by weight of said mass.

10. A mass of particles according to claim 9 wherein said polyetherimide comprises at least about 0.6 percent by weight of said mass.

11. A mass of particles according to claim 7 comprising predominantly particles in the size range 125–130 microns.

12. A mass of particles according to claim 6 wherein the thickness of insulating material on the several particles is substantially uniform throughout the mass regardless of the particle size distribution therein.

13. A mass of particles according to claim 7 wherein the thickness of the thermoplastic on the several particles is substantially uniform throughout the mass regardless of the particle size distribution therein.

14. A method for making a magnetic core for an electromagnetic device comprising the steps of:

spray-coating a mass of airborne ferromagnetic particles in the size range of about 5 microns to about 400 microns with an amorphous thermoplastic selected from the group consisting of polyetherimides, polyethersulfones and polyamideimides having a heat distortion temperature of at least about 200° C. to provide a mass of free-flowing thermoplastic-coated particles;

conveying said free-flowing particles via a suitable conveyor into a heated die while substantially uniformly heating said particles in said conveyor enroute to the die to a temperature below, but within about 110° C. of, the softening temperature of said thermoplastic without losing the free-flowability of said particles; and applying at least about 20 tons per square inch pressure to said particles in said die or shape the core and coalesce the thermoplastic into a substantially continuous binder matrix for the ferromagnetic particles.

15. A method of preparing a mass of ferromagnetic particles each comprising an iron core and a spray-deposited layer of thermoplastic encapsulating said core wherein said mass has a wide range of particle sizes therein and a substantially uniform thickness of thermoplastic on all of said particles regardless of their size comprising the steps of:

classifying said cores into batches of approximately the same particle size;

spray-depositing a predetermined thickness of said thermoplastic onto the particles in each batch; and thereafter mixing the several batches together to form said mass.

* * * * *

UNITED STATES PATENT AND TRADEMARK OFFICE

CERTIFICATE OF CORRECTION

PATENT NO. : 5,211,896

DATED : May 18, 1993

INVENTOR(S) : Robert W. Ward; David E. Gay

It is certified that error appears in the above-identified patent and that said Letters Patent is hereby corrected as shown below:

Claim 5, column 8, line 32 delete "130" and insert -- 350 -- .

Claim 11, column 8, line 63 delete "130" and insert -- 350 --.

Claim 14, column 10, line 4 delete "or" and insert -- to --.

Signed and Sealed this

Twenty-fourth Day of December, 1996

Attest:

BRUCE LEHMAN

*Attesting Officer* *Commissioner of Patents and Trademarks*